Jan. 16, 1945. H. H. WEST 2,367,451
HEATERS FOR EXTRUSION NOZZLES
Filed March 30, 1943
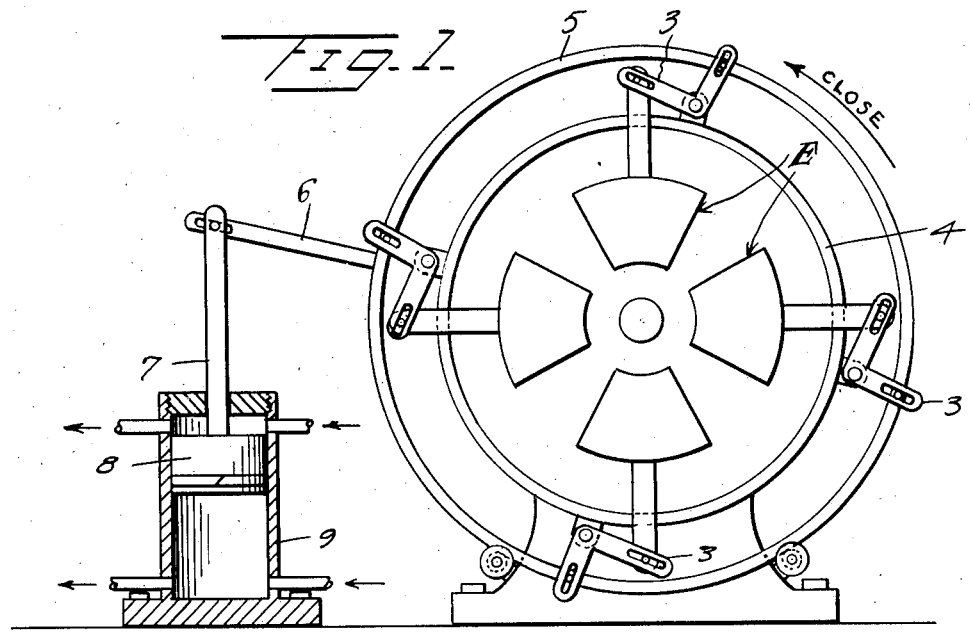
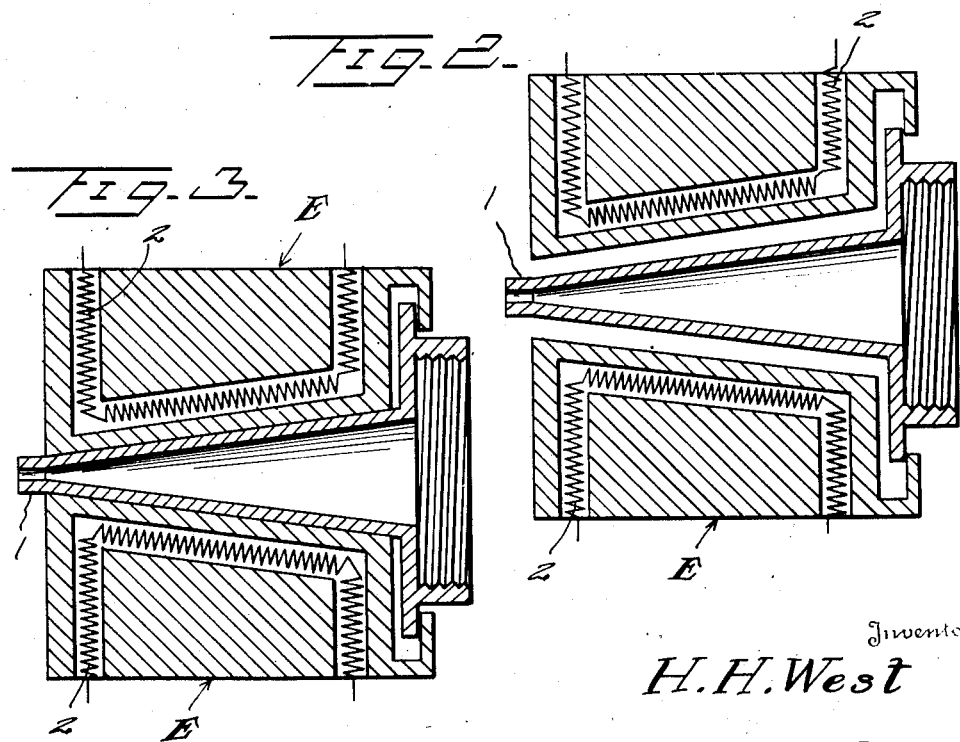
Inventor
H. H. West
By Wilfred Lawson
Attorney Patented Jan. 16, 1945

2,367,451

UNITED STATES PATENT OFFICE 2,367,451

HEATER FOR EXTRUSION NOZZLES

Harry H. West, Philadelphia, Pa.

Application March 30, 1943, Serial No. 481,137

2 Claims. (Cl. 219—39)

This invention relates to an extrusion nozzle and more particularly a nozzle of the type used in connection with a machine for the melting of plastics, and it is primarily an object of the present invention to provide means whereby heat may be transferred to the nozzle as desired to assure the material within the nozzle being of required temperature and wherein said heating means may be readily made ineffective in order to allow reduction of the temperature of the material within the nozzle.

In working plastics, one of the most important factors is to have heat at the right time, at the right place and at the right temperature, and the invention has for an additional object to provide a heating element for coaction with the nozzle from which a plastic is extruded to heat the nozzle and keep the same at a desired temperature and also to allow reduction of such temperature when necessary.

The invention consists in the details of construction and in the combination and arrangement of the several parts of my improved extrusion nozzle whereby certain important advantages are attained, as will be hereinafter more fully set forth.

In order that my invention may be better understood, I will now proceed to describe the same with reference to the accompanying drawing, wherein:

Figure 1 is a diagrammatic view, partly in elevation and partly in section, illustrating a heater for a plastic extrusion nozzle constructed in accordance with an embodiment of my invention.

Figure 2 is an enlarged detailed sectional view, and also of a somewhat diagrammatic character, illustrating the heating elements in ineffective positions, and Figure 3 is a view similar to Figure 2 but showing the heating elements in effective positions.

As disclosed in the accompanying drawing, 1 denotes a nozzle of the type used in connection with a machine for the melting of plastics and more particularly the material known as thermoplastic or thermosetting material. In the handling of such material, proper heat is a very important factor and in order that the material within the nozzle 1 may be raised to the desired temperature, heating elements E surround the nozzle 1 and in the present embodiment of the invention the heating elements E are of substantially the same construction and segmental in form, so that the same may be readily moved inwardly for direct contact with the nozzle 1 or moved away from the nozzle 1 to provide a sufficient air space to facilitate desired cooling of the nozzle, as by air.

Each of the heating elements E is of metal so that when it is desired to heat the nozzle, which is also of metal, there will be contact of metal with metal, thus assuring the most effective transfer of heat to the wall of the nozzle and from the wall of the nozzle to the material within the nozzle.

In the present embodiment of the invention, the heating elements E are electrically heated, as at 2, in a conventional manner although I do not wish to be understood as limiting myself to any particular heating medium.

As herein embodied, the elements E have operatively engaged therewith the bell crank levers 3 supported by a suitable structure 4. These bell crank levers 3 are also operatively engaged with an annular member 5, whereby upon rotation of said member 5 in the required direction, the elements E will be either moved into contact with the nozzle 1 or moved away from said nozzle.

As illustrated in the accompanying drawing, the annular member 5 is provided with an outstanding arm 6 operatively engaged with the outstanding stem 7 of a piston 8 working in a cylinder 9 and which piston is adapted to be moved as desired within the cylinder 9 by suitably controlled fluid pressure. However, other means than that illustrated may be used to effect the desired movement of the heating elements E with respect to the nozzle 1.

The heating elements E will, in practice, be heated to the temperature desired, so that when they are moved into contact with the nozzle 1, the heat of the elements E will be transferred through the wall of the nozzle 1 to the material within the nozzle 1 to raise the temperature of such material as desired. However, should such temperature of the material become too high, the elements E can be readily moved away from the nozzle 1 and the resultant space surrounding the nozzle 1, together with the spaces between the elements E, will allow for an instantaneous cooling of the nozzle 1 and the material therein by air.

In view of the foregoing, it is believed to be obvious that by means of the present invention of which the disclosure constitutes one embodiment, heat may be applied to the nozzle substantially instantaneously when wanted and when the elements E are moved away from the nozzle 1, air can be readily blown on the nozzle to cause the temperature to drop low enough and quick enough to stop the plastic material from melting or polymerizing in the nozzle 1.

From the foregoing description it is thought to be obvious that an extrusion nozzle constructed in accordance with my invention is particularly well adapted for use by reason of the convenience and facility with which it may be assembled and operated.

What is claimed is:

1. The combination with the extruding nozzle of a plastic machine, of a plurality of heating units disposed in an annular series around the nozzle, means supporting said units for movement radially with respect to the encircled nozzle, the units being movable inwardly to a position where each contacts the nozzle and being movable outwardly to positions where they are free of contact with the nozzle and with one another to provide air circulation spaces between the units and around the nozzle, and means for moving the units.

2. The combination with the extruding nozzle of a plastic machine, of a plurality of arcuate heating units disposed in a circular series around the nozzle, and means supporting the units for radial movement relative to the nozzle, the units when moved radially inwardly to the maximum extent contacting the nozzle and being in side by side contacting relation to form a complete annular heater around the nozzle.

HARRY H. WEST.